No. 711,365. Patented Oct. 14, 1902.
J. C. STUBBS.
WHEELED SCRAPER.
(Application filed Mar. 27, 1902.)
(No Model.) 2 Sheets—Sheet 1.

WITNESSES: F. B. Townsend Ada H. Pond.

INVENTOR James C. Stubbs, BY Samuel N. Pond. ATTORNEY.

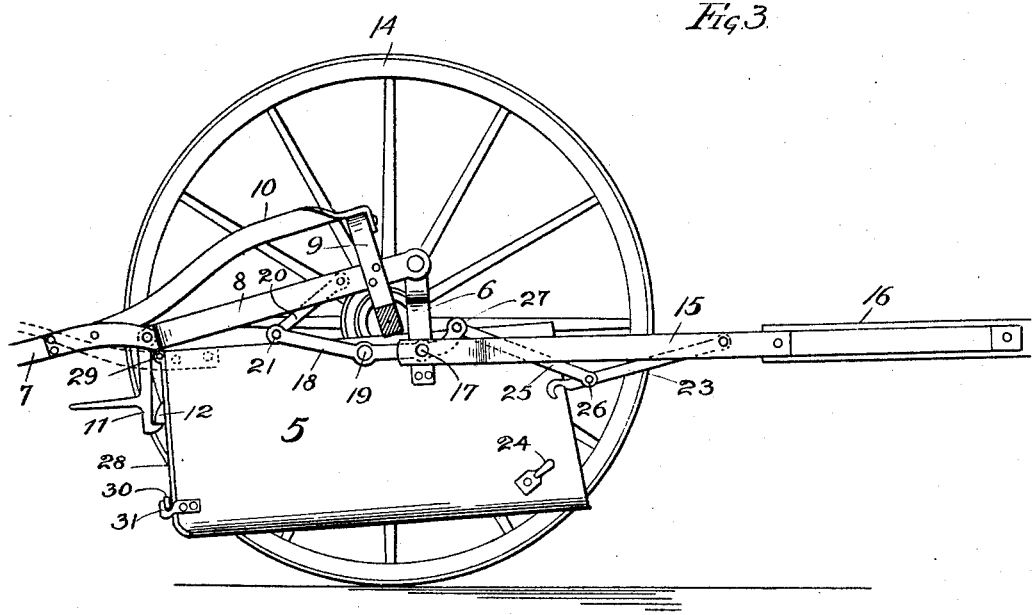
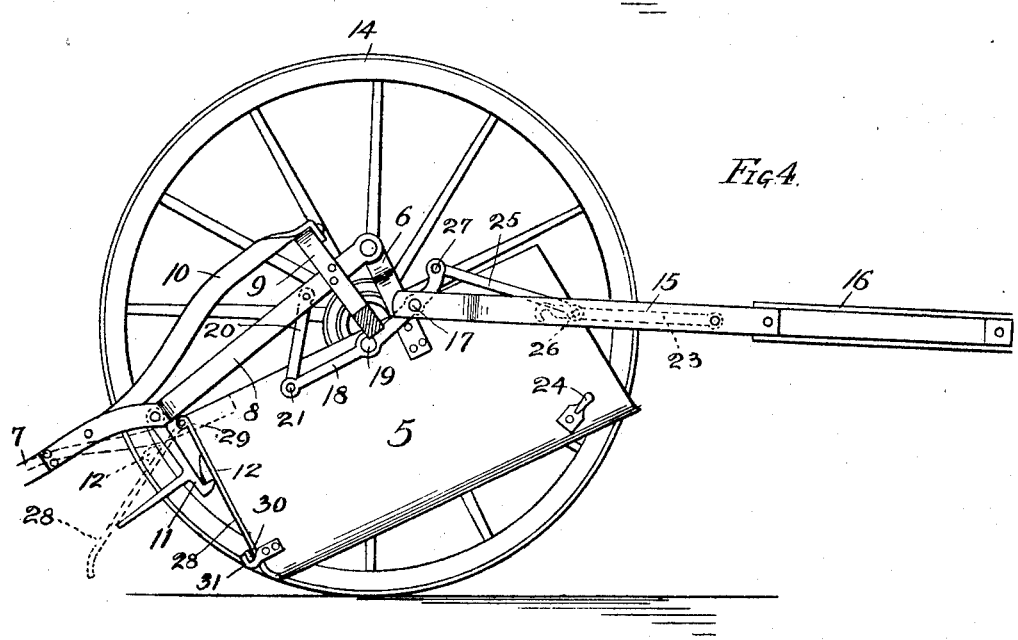

UNITED STATES PATENT OFFICE.

JAMES C. STUBBS, OF MOUNT PLEASANT, IOWA, ASSIGNOR, BY DIRECT AND MESNE ASSIGNMENTS, TO WARREN BECKWITH, OF MOUNT PLEASANT, IOWA.

WHEELED SCRAPER.

SPECIFICATION forming part of Letters Patent No. 711,365, dated October 14, 1902.

Application filed March 27, 1902. Serial No. 100,255. (No model.)

*To all whom it may concern:*

Be it known that I, JAMES C. STUBBS, a citizen of the United States, residing at Mount Pleasant, in the county of Henry and State of Iowa, have invented certain new and useful Improvements in Wheeled Scrapers, of which the following is a specification.

My invention relates to that class of earth excavating and transferring devices known as "scrapers," my improvements being applicable more particularly to that type of scraper in which the pan is suspended from an axle supported by a pair of carrying-wheels, the pan being lowered to cutting and scooping position and subsequently raised to carrying position and tilted to effect the dump by means of a rearwardly-extending lever actuated by the operator. A fault hitherto inherent in devices of this type has resided in the severe burden imposed upon the operator and team in the act of breaking out of the ground the cutting edge of the scraper-pan after it has received its load and when broken out of the ground elevating the pan to its latching and carrying position. In a prior application filed by me on the 4th day of February, 1902, under Serial No. 92,528, I have set forth an improvement in the construction of such scrapers designed to overcome this fault through the provision of a peculiar pivoted connection between the draft-irons and the arched axle-bar, whereby the initial draft of the team after the load has been taken on aids the operator in breaking the scraper-pan out of the ground and elevating it to latching and carrying position. My present invention has this same object in view, but for the carrying out thereof contemplates the employment of an entirely different mechanism and mode of operation. In my present invention the draft-irons instead of being pivotally connected to a pair of crank-arms rigid on the axle are connected with the johnson-bar in rear of the latter's connection to the arched axle through a lever-and-link connection so mounted and disposed that the impulse of the team imparted to the draft-bars longitudinally thereof is converted partially into a force tending to draw downwardly the rear end of the johnson-bar, and thereby elevate the pan, which is pivotally suspended from the forward end of the johnson-bar.

My invention is illustrated in the accompanying drawings, in which—

Figure 1:
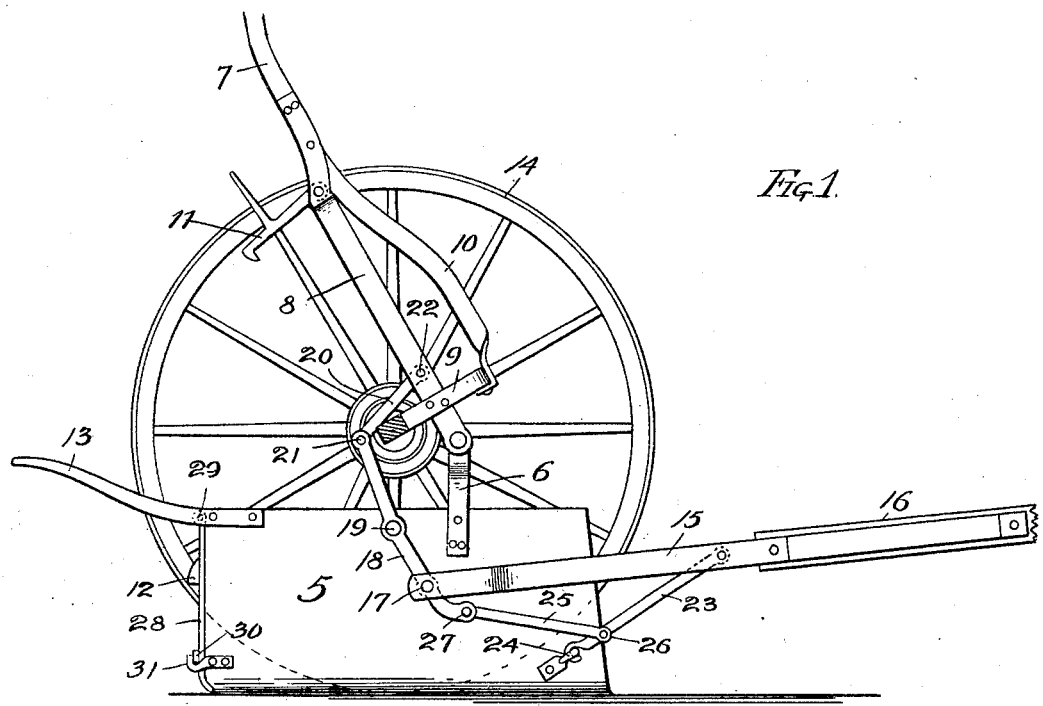
Figure 2:
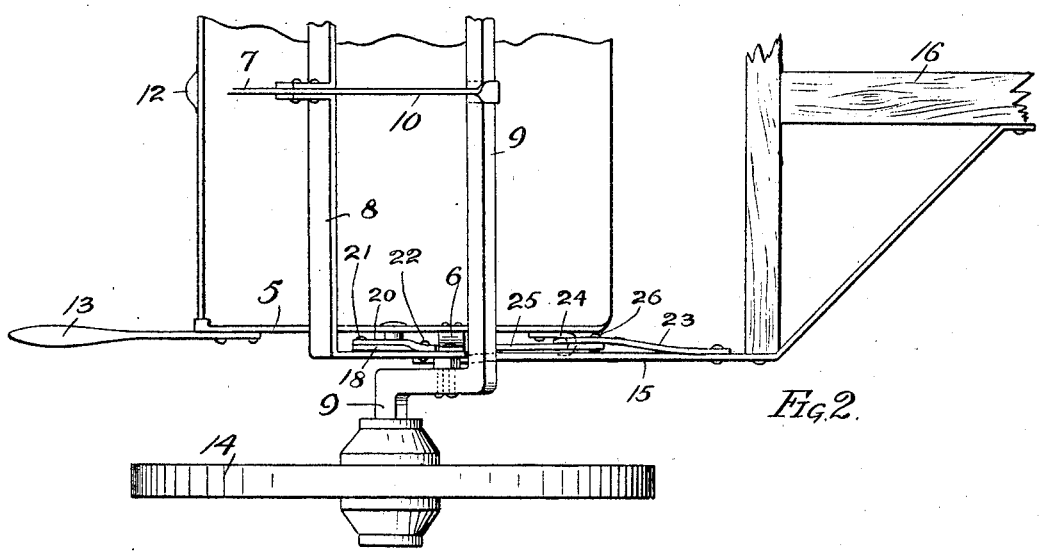

Figure 1 is a side elevation of a wheeled scraper constructed in accordance with my invention, the near wheel being removed for the sake of greater clearness and the pan being shown in loading position. Fig. 2 is a top plan view, broken away, of the device positioned as in Fig. 1. Fig. 3 is a view similar to Fig. 1, but showing the pan elevated to carrying position; and Fig. 4 is a similar side elevational view illustrating the manner in which a rear dump may be effected when desired.

In the drawings, 5 designates the pan in the usual form. This pan is pivotally suspended at points somewhat forward of its longitudinal center by hangers 6 from the forward end of a forked operating-lever commonly known in this art as the "johnson-bar." As shown, this johnson-bar comprises a rearwardly-extending handle (designated by 7) connected at its inner end to a fork or bail 8, the parallel forwardly-extending arms of which are rigidly secured to the offset bends of the usual arched axle 9. For the sake of increased rigidity a brace 10 connects the forward or inner end of the handle 7 with the top of the central offset portion of the axle 9. Pivoted to and pendent from the inner end of the handle 7 is the usual hook or latch 11, which when the bar is lowered engages a cooperating catch 12 on the rear of the pan to facilitate the elevation of the latter in the dumping operation. A pair of rearwardly-extending handles 13, secured to the upper rear corners of the sides of the pan, enable the operator to correctly poise and guide the pan in the loading operation. The outer ends of the axle 9 are journaled in a pair of carrying-wheels 14, and it will be observed by reference to Fig. 2 that the pan and the operating-bail 8 are made of a width slightly less than the longitudinal extent of the offset portion of the axle, whereby the pan and its lever-and-link connections to the johnson-bar, as hereinafter described, may be swung into a position within the arched portion of the axle and across the direct axis or transverse line of its support in the carrying-wheels.

At 15 are shown the usual draft-irons, connected at their forward ends to the pole 16.

Describing now my improved means for applying the draft to the scraper, in which my present invention principally resides, it will be observed that the draft-irons 15 are not secured directly either to the pan or to the axle, as is common and usual in devices of this class, but are pivotally connected rather at their inner ends, as at 17, to a pair of levers 18, respectively pivoted at 19 to the sides of the pan near their upper edges and approximately centrally of the longitudinal extent of the pan. The upper ends of these levers 18 are connected to the forks of the bail 8 in rear of the connection of the latter to the axle by means of links 20, the ends of which latter are pivoted to the levers and the bail at the points 21 and 22, respectively. Pivoted to and pendent from the draft-irons at a suitable point thereon are a pair of draft-hooks 23, the lower ends of which are adapted to engage and disengage the companion hooks 24, fast on the sides of the pan near the lower forward end of the latter. A pair of actuating-links 25 for these draft-hooks are pivoted at their forward ends at 26 to the draft-hooks, slightly back of the hooked ends of the latter, while at their rear ends said links are pivoted to the upwardly-turned forward ends of the levers 18 at the points 27 in advance of the pivots 17, connecting the draft-bars to said levers.

In view of the fact that in the above-described construction of scraper the pan is capable of being tilted backwardly as well as forwardly to effect the dump of its contents I preferably provide the rear end of the pan with a closure in the nature of a rear end-gate, (indicated at 28,) preferably hinged at its upper edge, as at 29, between the sides of the pan and normally held closed by a latch-bar 30 and a pair of catches 31 on the sides of the pan.

The operation, briefly described, is substantially as follows: In Figs. 1 and 2 the parts are shown in loading position, in which the handle 7 of the johnson-bar is elevated and the pan thereby lowered, this operation at the same time, through the relative movements imparted to links 20, levers 18, and links 25, forcing the draft-hooks 23 downwardly and forwardly into lock with their companion hooks 24. The team being then started up the load is taken on, the draft being applied to the pan at the points 19 and 24, on each side thereof, such slight rocking effect as the draft tends to produce on the levers 18, which is transmitted to the johnson-bar in rear of the latter's connection to the axle, being resisted by the weight of the forward end of the pan and its contents, which, it will be observed, are hung from the forward or overhanging end of the johnson-bar. The pan having been filled, the operator pulls down upon the handle 7. This action through links 20 rocks the levers 18 sufficiently to withdraw and release the draft-hooks 23, after which the succeeding effort of the team is applied to the pan solely at the pivotal points 19, a considerable component of the force represented by the effort of the team being transmitted through the rocking of the levers 18 and the draft upon the links 20 to the johnson-bar itself tending to draw downwardly that portion of the latter which is in rear of the axle. In view of the fact that this downwardly-acting force is applied to the johnson-bar at points in rear of the latter's connection with the axle it follows that the forward ends of the johnson-bar tend to rise, carrying with them the forward portion of the pan suspended therefrom. To a considerable extent, therefore, the effort of the team is applied in aiding the operator by the downward throw of the johnson-bar to break the point or cutting edge of the pan out of the ground and raise the pan and its contents to the carrying position. (Indicated in Fig. 3.) It will be observed that the arrangement and disposition of the levers and links whereby the forward movement of the draft-bars is in part converted into a downward movement of the handle of the johnson-bar is such that these levers and links do not interfere at all with the regular movements and course of travel of the pan in any of its several operations. After the load has been conveyed to the dumping-place the pan may be tilted in the usual fashion by elevating the johnson-bar, with the rear end of the pan connected thereto, through the latch 11, the load being discharged through the open front end of the pan in the usual manner. By reference to Fig. 4 it will be seen that by depressing the handle of the johnson-bar to its lowest position the pan may be tilted rearwardly to a sufficient extent to effect the discharge of the load through the rear end of the pan, where the gate 28 is employed. The latter feature is not essential to the beneficial action and results of my invention; but I prefer to employ the same in view of the fact that in many dumping situations the load can more conveniently be discharged from the rear of the pan than in front of the same.

So far as I am aware I am the first to provide a positive connection between the draft-irons and the johnson-bar in rear of the latter's connection with the axle of such a character that a component of the force exerted by the team upon the draft-irons is applied to the johnson-bar in a direction tending to rock the latter into downward or latching position relatively to the pan. I do not, therefore, limit myself to the precise means herein shown and described for transmitting this force from the draft-irons to the johnson-bar, although I believe that the lever-and-link connections through the pan, substantially as herein shown and described, are the simplest and most advantageous, and therefore prefer to employ the latter in carrying out my invention.

I claim—

1. In a scraper of the class described, the combination with the axle and its carrying-wheels, the johnson-bar rigidly secured to the axle, and the pan suspended from the overhanging end of the johnson-bar, of draft-beams, and pivotal connections intermediate said draft-beams and johnson-bar in rear of the latter's connection with the axle through which a portion of the draft is applied to draw down the handle end of the johnson-bar and thereby elevate the pan, substantially as described.

2. In a scraper of the class described, the combination with the axle and its carrying-wheels, the johnson-bar rigidly secured to the axle, and the pan suspended from the overhanging end of the johnson-bar, of draft-beams, and lever-and-link connections intermediate the inner ends of said draft-beams and the johnson-bar in rear of the latter's connection with the axle through which a portion of the draft is applied to draw down the handle end of the johnson-bar and thereby elevate the pan, substantially as described.

3. In a scraper of the class described, the combination with the arched axle and its carrying-wheels, the johnson-bar rigidly secured on the bends of the axle, and the pan suspended from the overhanging end of the johnson-bar, of a pair of levers pivoted intermediate their ends on the sides of the pan, draft-beams pivoted on said levers forward of their fulcrums, and links pivotally connecting said levers in rear of their fulcrums with the johnson-bar at points in rear of the latter's connection with the axle, substantially as described.

4. In a scraper of the class described, the combination with the arched axle and its carrying-wheels, the johnson-bar rigidly secured on the bends of the axle, the pan, and the pan-hangers pivotally connected to the overhanging forward end of the johnson-bar, of a pair of levers pivoted intermediate their ends on the sides of the pan at approximately the longitudinal center thereof, draft-beams pivotally connected to said levers forward of their fulcrums, links pivotally connecting the rear ends of said levers with the johnson-bar at points in rear of the latter's connection with the axle, draft-hooks pivoted to and depending from said draft-beams, and actuating-links for said draft-hooks pivoted to the latter and to the forward ends of said levers, substantially as described.

5. In a scraper of the class described, the combination with the arched axle and its carrying-wheels, the johnson-bar rigidly secured on the bends of the axle, the pan, and the pan-hangers pivotally connected to the overhanging forward end of the johnson-bar, of a pair of levers having upwardly-turned forward ends pivoted intermediate their ends on the sides of the pan at approximately the longitudinal center thereof, draft-beams pivotally connected to said levers between their fulcrums and their upwardly-turned forward ends, links pivotally connecting the rear ends of said levers with the johnson-bar at points in rear of the latter's connection with the axle, draft-hooks pivoted to and depending from said draft-beams, and actuating-links for said draft-hooks pivoted to the latter back of their hooked ends and to the forward upwardly-turned ends of said levers, substantially as described.

JAMES C. STUBBS.

Witnesses:
LIZZIE McCLELLAND PALMER,
LE ROY A. PALMER.